US009713777B2

(12) United States Patent
Peterson

(10) Patent No.: US 9,713,777 B2
(45) Date of Patent: Jul. 25, 2017

(54) MAGNETIC CONSTRUCTION TOY

(71) Applicant: Build & Imagine, LLC, Oakland, CA (US)

(72) Inventor: Laura E. Peterson, Oakland, CA (US)

(73) Assignee: Build & Imagine, LLC, Oakland, CA (US)

( * ) Notice: Subject to any disclaimer, the term of this patent is extended or adjusted under 35 U.S.C. 154(b) by 0 days.

(21) Appl. No.: 15/023,667

(22) PCT Filed: Feb. 8, 2015

(86) PCT No.: PCT/US2015/014942
§ 371 (c)(1),
(2) Date: Mar. 21, 2016

(87) PCT Pub. No.: WO2015/123119
PCT Pub. Date: Aug. 20, 2015

(65) Prior Publication Data
US 2016/0250562 A1    Sep. 1, 2016

Related U.S. Application Data

(63) Continuation of application No. 14/180,661, filed on Feb. 14, 2014, now abandoned.

(51) Int. Cl.
*A63H 33/04* (2006.01)
*B29C 65/08* (2006.01)
*B29C 65/56* (2006.01)
*B29L 31/52* (2006.01)

(52) U.S. Cl.
CPC ......... *A63H 33/046* (2013.01); *A63H 33/044* (2013.01); *B29C 65/08* (2013.01); *B29C 65/56* (2013.01); *B29L 2031/5209* (2013.01)

(58) Field of Classification Search
CPC .................................................. A63H 43/046
USPC ................... 446/92, 108, 114, 115, 129, 137
See application file for complete search history.

(56) References Cited

U.S. PATENT DOCUMENTS

| | | |
|---|---|---|
| 2,795,893 A | 6/1957 | Vayo |
| 3,095,668 A | 7/1963 | Dorsett |
| 3,196,579 A | 7/1965 | Lepper |
| 3,998,004 A | 12/1976 | Ehrlich |

(Continued)

FOREIGN PATENT DOCUMENTS

| | | |
|---|---|---|
| EP | 2341993 B1 | 1/2013 |
| JP | 06-302425 | 10/1994 |

(Continued)

OTHER PUBLICATIONS

Website for nProduct wood Smart Blocks, edtoy.net/bbs/bbs/board.php?bo_table=nProduct23&wr_id=4, screenshot Sep. 30, 2013.

(Continued)

*Primary Examiner* — Melba Bumgarner
*Assistant Examiner* — Joseph B Baldori
(74) *Attorney, Agent, or Firm* — Jill A. Jacobson

(57) ABSTRACT

A construction toy is provided, with illustrated panels that connect together magnetically to assemble two- and three-dimensional structures and background scenery, optionally with accessory items that bind magnetically or mechanically to the panels to embellish the structures or scenes that are created.

18 Claims, 13 Drawing Sheets

(56) References Cited

U.S. PATENT DOCUMENTS

| | | | |
|---|---|---|---|
| 4,238,905 A * | 12/1980 | MacGraw, II | A63H 33/046 273/157 R |
| 4,334,871 A * | 6/1982 | Roane | A63H 33/046 434/211 |
| 4,836,787 A * | 6/1989 | Boo | A63H 33/048 434/403 |
| 4,846,689 A | 7/1989 | Day | |
| 5,178,573 A | 1/1993 | Smith | |
| 5,347,253 A | 9/1994 | Ogikubo | |
| 5,411,262 A | 5/1995 | Smith | |
| 5,651,715 A | 7/1997 | Shedelbower | |
| 5,666,712 A * | 9/1997 | Cvetkov | A63F 9/34 29/458 |
| 5,820,383 A | 10/1998 | Levins | |
| 6,024,626 A | 2/2000 | Mendelsohn | |
| 6,431,936 B1 | 8/2002 | Kiribuchi | |
| 6,604,976 B2 | 8/2003 | Lenkoff | |
| 6,749,480 B1 * | 6/2004 | Hunts | A63H 33/046 446/85 |
| 6,846,216 B1 | 1/2005 | Balanchi | |
| 7,160,170 B2 | 1/2007 | Yoon | |
| 7,247,075 B2 | 7/2007 | von Oech | |
| 7,255,624 B2 | 8/2007 | Daftari | |
| 7,270,329 B2 | 9/2007 | Barthold | |
| 7,297,042 B2 | 11/2007 | Whitehead | |
| 7,413,493 B2 | 8/2008 | Toht et al. | |
| 7,507,136 B2 | 3/2009 | Patton | |
| 7,955,156 B2 | 6/2011 | Toht et al. | |
| 7,963,818 B2 | 6/2011 | Fullerton et al. | |
| 7,988,518 B2 | 8/2011 | Kim et al. | |
| 8,038,502 B2 | 10/2011 | Loetz | |
| 8,100,735 B2 | 1/2012 | Park | |
| 8,303,366 B2 | 11/2012 | Tremblay et al. | |
| 8,458,863 B2 * | 6/2013 | Hunts | H01F 7/0242 24/303 |
| 8,491,312 B2 | 7/2013 | Rudisill | |
| 8,522,464 B2 | 9/2013 | Rehnberg | |
| 8,556,673 B1 | 10/2013 | Winting | |
| 8,615,853 B2 | 12/2013 | Rathbun | |
| 8,850,683 B2 * | 10/2014 | Haughey | A63H 33/046 29/428 |
| 2002/0077017 A1 | 6/2002 | Lenkoff | |
| 2002/0193046 A1 | 12/2002 | Zebersky | |
| 2006/0135032 A1 | 6/2006 | Wijerama | |
| 2007/0287353 A1 | 12/2007 | Vicentelli | |
| 2008/0188158 A1 | 8/2008 | Massa | |
| 2009/0004946 A1 | 1/2009 | Sinisi et al. | |
| 2014/0227934 A1 | 8/2014 | Rudisill | |
| 2014/0256210 A1 | 9/2014 | Johnson | |
| 2014/0302741 A1 | 10/2014 | Whittaker | |
| 2015/0072587 A1 | 3/2015 | Ornstein et al. | |
| 2015/0104993 A1 | 4/2015 | Kennedy | |
| 2015/0231521 A1 | 8/2015 | Peterson | |

FOREIGN PATENT DOCUMENTS

| | | |
|---|---|---|
| JP | 08-257252 | 10/1996 |
| JP | 2001-173889 | 6/2001 |
| JP | 2003-190663 | 7/2003 |
| JP | 2005-253496 | 9/2005 |
| JP | 2006-055231 | 3/2006 |
| JP | 2010-234050 | 10/2010 |
| JP | 2010-259613 | 11/2010 |
| KR | WO2009/154315 A1 | 12/2009 |
| WO | WO2006/044618 A2 | 4/2006 |
| WO | WO2011/018331 A1 | 2/2007 |
| WO | WO2010/111189 A1 | 9/2010 |
| WO | WO2011/143019 A1 | 11/2011 |
| WO | WO2014/041473 A2 | 3/2014 |
| WO | WO2015/123119 A1 | 8/2015 |

OTHER PUBLICATIONS

Website for Build & Imagine, buildandimagine.com, screenshot Apr. 1, 2014.
U.S. Appl. No. 14/180,661, Office Action dated May 7, 2015.
U.S. Appl. No. 14/180,661, Office Action dated Oct. 21, 2015.

* cited by examiner

2A

2C

A

45

B

MAGNETIC CONSTRUCTION TOY

CROSS-REFERENCE TO RELATED APPLICATIONS

This application is a U.S. National Phase application under 35 U.S.C. §371 of PCT/US2015/014942, filed on Feb. 8, 2015, and claims priority to U.S. application Ser. No. 14/180,661, filed on Feb. 14, 2014, which is incorporated herein by reference in its entirety.

FIELD OF THE INVENTION

The invention relates to a construction toy, in particular a toy that includes illustrated panels that connect magnetically at their edges to construct structures or scenes.

BACKGROUND

Construction toys, or building sets, have long provided children with educationally enriching play. Through the act of building, kids develop foundational science, technology, engineering and math (STEM) skills such as spatial reasoning and decision making. Magnetic construction toys such as Magformers®, Tegu®, and Magna-Tiles® have made building more accessible to children by having pieces that join magnetically without the need for precise dexterity that is often required when assembling with plastic building bricks such as Lego® or even plain wooden blocks that can easily topple. These existing magnetic construction toys are composed of abstract plastic or wood shapes (panels) that can be combined magnetically to form a larger structure.

Existing panel type magnetic building sets do a good job in getting kids to build structures, but they fall short in the opportunity to create long-term engagement by involving children in narrative development. The structures that are formed are abstract, which makes it difficult for many children to engage in imaginative play with the structures. Contrast this to Lego®, which has had much success in theming their once exclusively abstract plastic bricks, allowing children to act out and embellish upon stories implied by the themes. The approach to combine structural and narrative building is especially important to interest girls, who have historically been underserved in the construction toy category.

GeoMag® has made a few attempts with themed magnetic building sets, but these sets are cumbersome to play with as there are many small parts required for assembly since the magnets are separate pieces rather than being housed within the shapes/panels.

In addition to a deficiency in providing thematic backdrops for imaginative play, existing magnetic construction toys present a number of challenges for getting building pieces to magnetically attract regardless of orientation. For example, some magnetic building toys have a set orientation dictated by magnetic polarity (see, e.g., PCT Application No. WO 2010111189 A1), which limits the way the child can combine panels. Others use magnets that spin around or roll to attract the magnets in a neighboring panel (see, e.g., U.S. Pat. No. 7,160,170 B2 and Japanese patent publication nos. 2003-190663 and 06-302425). This allows for panels to connect regardless of orientation but requires expensive Neodynium magnets, which also pose a safety risk to children due to their strength. Other building sets separate the magnets from the panels so that the shapes don't have a set magnetic polarity (see, e.g., U.S. Publication No. 2007/0287353). This works to provide the child with freedom of choice but creates an inconvenience with additional small parts to keep track of as well as posing a choking and swallow hazard.

There is a need for an improved magnetic construction toy that provides illustrated, thematic backdrops for imaginative play and in which magnetic panels may be assembled and re-assembled with ease and without small pieces that could present a choking hazard to small children.

BRIEF SUMMARY OF THE INVENTION

Construction toys are disclosed herein that encourage building and imaginative play via illustrated panels that connect magnetically to form a larger structure or scene. The panel illustrations provide jumping off points for storytelling and imaginative play. The panels connect regardless of orientation, providing the child with freedom of choice to combine the panels in any way they choose. The magnets are housed within the edge(s) of each panel, so that no separate small magnet connectors are required. Magnetic accessory items can optionally be added to the face(s) of panels to further customize and embellish the scene. The freedom of configuration and the optional magnetic accessory items increase replayability as children modify the story context and experiment with different designs, providing endless opportunities for imaginative play.

Construction toys described herein include a plurality of (a group of two or more) panels, with each panel including two faces and at least three edges. At least one panel includes an illustration on at least one face, and each panel includes at least one magnetic edge. A magnetic edge includes at least one magnet embedded within the panel in proximity to the panel edge. Magnets are configured within magnetic edges such that panels may be connected by magnetic attraction between their magnetic edges to form illustrated structures and/or scenes. In some embodiments, each edge of each panel is a magnetic edge.

In an embodiment, a magnetic edge includes at least one multipole magnet that contains adjacent pairs of magnetic poles of opposite polarity and in alternating magnetic orientation, wherein the number of poles is equal to 4n where n is an integer greater than or equal to 1. In one embodiment, a magnetic edge includes at least one such multipole magnet that is a block magnet having a length, a width, and a thickness, wherein the multipole magnet is oriented with its length parallel to the panel edge and with its width perpendicular to the panel face, and is embedded to a depth of at least its thickness in the panel edge, and wherein pairs of poles are disposed along the length of the magnet with alternating magnetized directions through the width and perpendicular to the length of the magnet. In some embodiments, at least one panel includes the multipole magnets spaced symmetrically on each edge of the panel and disposed around the panel in the same orientation of polarity. In some embodiments, at least one panel includes two of the multipole magnets spaced symmetrically and a constant distance apart on each edge of the panel and disposed around the panel in the same orientation of polarity.

In another embodiment, a magnetic edge includes two dual pole magnets that are oriented with opposite polarity with respect to one another. In one embodiment, each dual pole magnet is a block magnet that includes a length, a width, and a thickness, wherein each dual pole magnet is oriented with its length parallel to the panel edge and with its width perpendicular to the panel face, and is embedded to a depth of at least its thickness in the panel edge, and wherein each dual pole block magnet is magnetized in the direction of its width and is oriented with the magnetized direction perpendicular to the length of the magnet. In some embodiments, dual pole magnets are spaced symmetrically and a constant distance apart on magnetic edges of panels. In some embodiments, each edge of each panel includes the dual pole magnets, oriented in alternating polarity around the panel.

In a further embodiment, a magnetic edge includes an even number of multipole magnets that each contains an odd number of pairs of magnetic poles of opposite polarity and in alternating magnetic orientation, wherein each multipole magnet is disposed along the edge with alternating magnetized directions through each pair of poles, and wherein the multipole magnets on the panel edge are oriented with opposite polarity with respect to one another. In one embodiment, each of the multipole magnets is a block magnet that includes a length, a width, and a thickness, wherein the multipole magnets are oriented with their lengths parallel to the panel edge and with their widths perpendicular to the panel face, and are embedded to a depth of at least their thicknesses in the panel edge, and wherein pairs of poles are disposed along the length of each magnet with alternating magnetized directions through the width and perpendicular to the length of the magnet. In some embodiments, at least one panel includes the multipole magnets spaced symmetrically and a constant distance apart on each edge of the panel, and disposed around the panel in alternating orientation of polarity.

In some embodiments, panels may be connected at their magnetic edges to form a three-dimensional structure or scene, wherein illustrations on faces of the panels provide illustrated interior and/or exterior walls and/or scenery. In some embodiments, panels may be connected at their magnetic edges such that illustrations on adjacent faces form a contiguous illustrated scene. In some embodiments, panels may be rearranged in sequence and/or converted to different orientations to create a multitude of different scenes.

Panels of a construction toy as described herein may include magnetic edges of the same or different lengths. In some embodiments, at least some panels include magnetic edges of the same length and connect along the entire lengths of their magnetic edges. In some embodiments, the panels include magnetic edges of differing lengths, and panels with magnetic edges of shorter lengths connect with a portion of a longer length magnetic edge along the entire length of the shorter length edge.

In some embodiments, at least one accessory item is provided that is capable of attachment to at least one face of at least one panel. In various embodiments, an accessory item may attach or adhere to the face of panel by magnetic attraction, adhesion, static electricity, or mechanical attachment. In various embodiments, an accessory may include a human or animal figure, furniture, clothing food, a tool, an appliance, a bag, a container, a scenery embellishment, a vehicle, a light fixture, or a weapon. In one embodiment, an accessory is a handle for carrying a group of stacked panels.

In some embodiments, at least one panel includes a material that will magnetically attract a magnetic or magnetically receptive portion of an accessory item to a face of the panel. In one embodiment, at least one accessory item is provided that includes a magnetic material on at least one surface or portion of the accessory item, which attaches by magnetic attraction to a panel face (e.g., attaches by magnetic attraction to a magnetic receptive material that is located on or beneath the exterior surface of the panel face). In another embodiment, at least one accessory item is provided that includes a magnetic receptive material on at least one surface or portion of the accessory item, which attaches by magnetic attraction to a panel face (e.g., attaches by magnetic attraction to a magnetic material that is located on or beneath the exterior surface of the panel face).

In some embodiments, at least a portion of at least one face of at least one panel includes a magnetic material (e.g., located on or beneath the exterior surface of the panel face), which will bind a magnetic receptive surface or portion of an accessory item by magnetic attraction. In some embodiments, at least a portion of at least one face of at least one panel includes a magnetic receptive material (e.g., located on or beneath the exterior surface of the panel face), which will bind a magnetic surface or portion of an accessory item by magnetic attraction.

In some embodiments, a panel may be constructed with an interior substructure that contains two faces and the same number of edges as the finished panel, with face and edge dimensions that are proportionate or substantially proportionate to those of the finished panel.

In an embodiment, a panel includes at least one magnet embedded in proximity to at least one edge of a substructure, at least one magnetic receptive material covering at least a portion of at least one face of the substructure, and two exterior sheets that form the exterior faces of the panel and include an illustration on at least one exterior-facing surface of an exterior sheet. In some embodiments, a magnetic surface or portion of an accessory item may bind to the exterior-facing surface of a panel face, by magnetic attraction to a magnetic receptive material beneath the exterior sheet.

In another embodiment, a panel includes at least one magnet embedded in proximity to at least one edge of a substructure, and at least one magnetic receptive material covering at least one face (e.g., covering the entire face or substantially the entire face of the substructure), and includes an illustration on the exterior-facing surface of the magnetic receptive material. In some embodiments, a magnetic surface or portion of an accessory item may bind to the exterior-facing surface of the magnetic receptive material.

In a further embodiment, a panel is constructed of magnetic receptive material, includes at least one magnet embedded in proximity to an edge, and includes illustrations printed on at least one exterior-facing surface of the magnetic receptive material. In some embodiments, a magnetic surface or portion of an accessory item may bind to the exterior-facing surface of the magnetic receptive material.

In some embodiments, at least one panel includes one or more spacer(s) on at least one face or at least one edge. A spacer creates a gap between panels when they are stacked with faces parallel to each other and bound together by magnetic attraction at their magnetic edges to facilitate pulling the stacked panels apart. A spacer may decrease magnetic attraction between the stacked magnetic edges and/or provide a finger hold between stacked panels. In some embodiments, a spacer includes a ridge or a recessed or beveled area.

In some embodiments, a handle is provided that is attached to or capable of attachment to an edge or face of at least one panel, to facilitate carrying panels that are stacked with faces parallel to each other and bound together by magnetic attraction at their magnetic edges.

BRIEF DESCRIPTION OF THE DRAWINGS

The figures herein are not necessarily drawn to scale.

FIG. 2A shows an illustrated panel without accessory items. FIG. 2B shows accessory items which may be used to embellish the scene depicted on the panel. FIG. 2C shows accessory items added to the scene on the panel.

FIG. 13A shows panels meeting at a 90 degree angle. FIG. 13B shows panels assembled in a T-shaped configuration.

DETAILED DESCRIPTION

Figure 1:
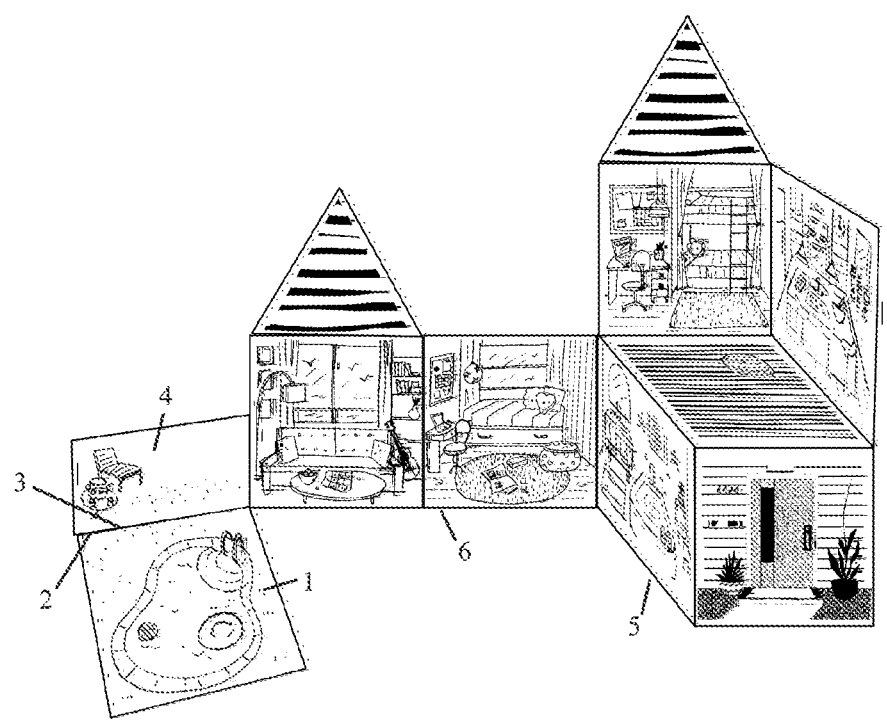
FIG. 1 depicts an assembly of illustrated panels as described herein, showing schematically how a number of panels can be connected together by magnetic attraction at their edges to form a three dimensional structure and additional outdoor scenery.

Construction toys and methods of use for constructing structures and scenes are provided. The construction toys disclosed herein contain panels with illustrations on at least one side and that connect via magnetic attraction at their edges. The illustrations allow for imaginative play, and panels are optionally configured for connection in several different ways to change the scene or structure, stimulating creativity. Optional accessory items may connect to the panels (e.g., magnetically, adhesively, via static electricity, or mechanically), to embellish scenes and enhance creative play.

Illustrated Panels

The construction toys described herein contain a plurality of panels which may be combined to form three dimensional structures, such as houses, buildings, enclosures, etc., or backdrop scenery, for imaginative play. A plurality of panels of a construction toy, as described herein, refers to two or more panels and typically refers to a number of panels that is sufficient for the user to construct a three-dimensional structure and/or scenery backdrop for imaginative play.

Each panel contains at least two faces, typically parallel or substantially parallel to each other, and at least three edges. The faces are in the form of polygon shapes, such as triangles, squares, rectangles, pentagons, etc. Each panel contains two faces of the same polygon shape and of the same or substantially the same dimensions, and each side of the polygon forms an edge of the panel (e.g., three edges for a triangular panel, four edges for a square or rectangular panel, etc.). The edges are perpendicular or substantially perpendicular to the faces. Each edge has a depth suitable to contain one or more embedded magnet(s), as described herein.

At least one (i.e., one or more than one) panel of the construction toy contains an illustration on at least one face. In some embodiments, at least one panel contains illustrations on both faces. In some embodiments, several panels (i.e., more than one), a majority of panels, or all panels contain illustrations on at least one face. In some embodiments, at least one panel, several panels, a majority of panels, or all panels contain illustrations on both faces.

An "illustration" (e.g., an illustration on an illustrated face of a panel of a construction toy as described herein) refers to an image or depiction, including but not limited to, a drawing, sketch, painting, photograph, engraving, etching, or embossing, of things seen, remembered, or imagined, using a graphic or tactile representation. The illustrations may be in the form of pictures or scenery, for example, an interior or exterior floor, wall, or roof of a building or other structure, or rural, urban, or natural exterior scenes. Illustrations may be printed, engraved, etched, or embossed on the exterior face of a panel, or may be created by a user directly on the face of a panel or affixed to the face. Exemplary, nonlimiting materials which may be used for the exterior, illustrated surface of a face of a panel include wood, plastic, magnetic receptive material, magnetic material, cardboard, etc.

Each panel contains at least one magnetic edge. A magnetic edge refers to an edge of a panel that contains at least one magnet embedded within the panel and in proximity to the edge, and configured to magnetically attract a magnetic edge of another panel. In some embodiments, all edges of a panel are magnetic. Panels may be connected by magnetic attraction between their respective magnetic edges to construct structures or illustrated backdrops and/or scenery. In some embodiments, panels are connected with magnetic edges parallel (180° angle). In another embodiment, panels are connected with magnetic edges perpendicular (90° angle). In other embodiments, panels are connected at their magnetic edges at an acute or obtuse angle.

In some embodiments, panels may be connected magnetically at adjacent edges to form a contiguous illustrated scene, such as a rural scene, cityscape, or natural landscape.

In some embodiments, panels may be connected magnetically at their magnetic edges to form a three dimensional structure, such as a house, building, or other enclosure, with illustrated interior and/or exterior walls, floors, and/or ceilings/roofs, and optionally associated outdoor scenery. This is shown schematically in FIG. 1.

FIG. 1 shows panels with illustrated faces (e.g., 1, 4) connected at magnetic edges (e.g., 2, 3). Panels may be connected, for example, in a three-dimensional configuration (5) (e.g., perpendicular magnetic edges) or side-by-side (6) (e.g., parallel magnetic edges), or at other angles. Structures (e.g., 5) and/or scenery or enhancements to structures (e.g., 1, 4) may be constructed.

In some embodiments, illustrations are designed such that panels may be rearranged in sequence and/or orientation to form different structures and/or scenery from the same set of panels.

Construction toys as described herein may contain panels of the same size and shape or of different sizes and/or shapes. (See, e.g., FIGS. 1 and 7.) In some embodiments, adjacent panels in a structure or scene have edges of the same length, such that they magnetically connect along the entire lengths of the adjacent magnetic edges (e.g., 22 and 23 in FIG. 7). In some embodiments, adjacent panels in a structure or scene have edges of different lengths and the shorter magnetic edge of one panel (e.g., 25 or 26 in FIG. 7) magnetically connects along a portion of the length of the longer magnetic edge of the other panel (e.g., 24 in FIG. 7).

A panel face may optionally contain a material on at least a portion of its exterior surface, or interior to at least a portion of the face of the panel, configured to magnetically attract one or more accessory item(s) to the exterior surface of the panel, to embellish the illustration depicted on the panel or depicted in a combination of panels that are constructed to form an illustrated structure or scene. In some embodiments, a panel face may contain an interior or exterior magnetic receptive material, which may attract a magnetic surface of an accessory item. In other embodiments, a panel face may contain an interior or exterior magnetic material, which may attract a magnetically receptive surface of an accessory item. In other embodiments, a panel face may contain both magnetic and magnetically receptive materials in different interior and/or exterior areas of the panel face. "Magnetic receptive material" refers to a material that attracts a magnetic material but is not itself permanently magnetic. In various embodiments of panels and/or accessories described herein, magnetic receptive material may include, but is not limited to, rolled steel, a steel plate or grid, or a flexible magnetic roll product, such as FlexIron™, FlexMag™ or RubberSteel®.

In one embodiment, at least a portion of the exterior surface of a panel face includes a magnetic receptive material. In another embodiment, at least a portion of the exterior surface of a panel face includes a magnetic material. In a further embodiment, at least a portion of the exterior surface of a panel face includes a magnetic receptive material and at least a portion of the exterior surface of the face also includes a magnetic material. In a still further embodiment, the exterior surface of the panel face is constructed of a material that is not magnetic or magnetic receptive, and magnetic and/or magnetic receptive material(s) are interior to the panel face but configured such that they are capable of magnetically attracting magnetic receptive and/or magnetic materials, respectively, to the exterior surface of the panel face.

In some embodiments, a panel is constructed with a substructure that includes at least one magnetic edge (i.e., at least one or more embedded magnet(s) as described herein). A "substructure" is interior to the panel surface, and is the same or substantially the same shape as the finished panel. A substructure contains two faces and the same number of edges as the finished panel, and at least one edge of the substructure contains one or more embedded magnet(s). Generally, the lengths of the edges are in the same or substantially the same proportions as the finished panel. One or more materials may cover the face(s) and/or edge(s) of the substructure to produce the finished panel. In some embodiments, the substructure may be constructed of plastic, wood, foam, cardboard, or a combination thereof, or other suitable materials known to those of skill in the art.

Figure 9:
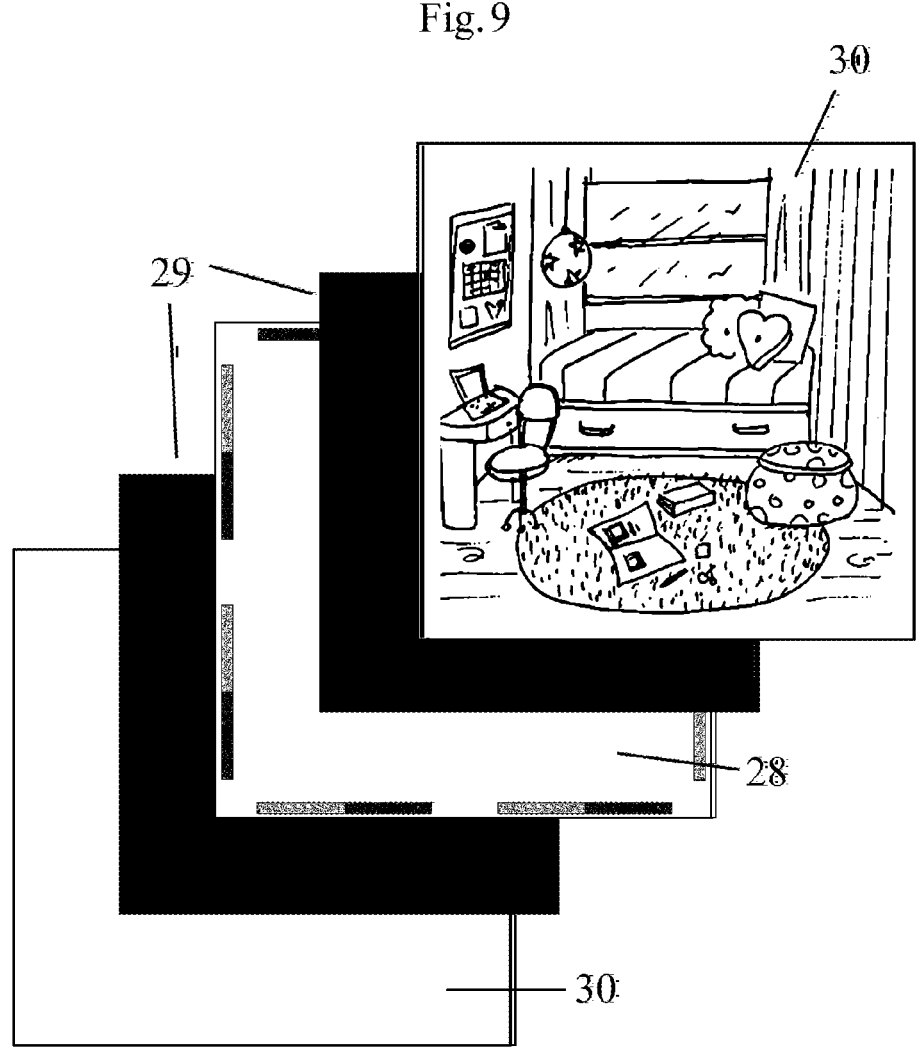
FIG. 9 schematically depicts one embodiment of a panel, showing layers of materials of which the panel is composed.

In some embodiments, depicted schematically in FIG. 9, a panel is constructed with at least one magnetic receptive material (e.g., magnetic receptive sheet) 29 covering at least a portion of at least one face of the substructure 28, or the entire face, and at least one exterior sheet 30 that covers the magnetic receptive material and includes an illustration on its exterior-facing surface. In one embodiment, the panel includes magnetic receptive material (e.g., magnetic receptive sheets) 29 covering at least a portion of each face of the substructure 28, or both entire faces, and two exterior sheets 30 that cover the magnetic receptive materials and include illustrations on their exterior-facing surfaces. In some embodiments, the exterior sheet(s) may be constructed of a printed sticker, printed cardstock, a vinyl layer printed onto magnetically receptive material, wood veneer with illustrations heat transferred, painted, etc. onto the surface, or other suitable materials known to those of skill in the art.

In some embodiments, a panel is constructed with a substructure that includes at least one magnetic edge, as described herein, and at least one magnetic receptive sheet covering one face of the substructure (a portion of the face or the entire face) and including an illustration on the exterior-facing surface of the magnetic receptive sheet, which forms an exterior face of the panel. In one embodiment, the panel includes two magnetic receptive sheets each covering one face of the substructure (each magnetic receptive sheet covering a portion of one face or one entire face of the substructure) and including illustrations on both exterior-facing surfaces of the magnetic receptive sheets, forming the two exterior faces of the panel.

In some embodiments, a panel is constructed of magnetic receptive material, with at least one magnetic edge, as described herein, and an illustration on at least one exterior face of the panel. In one embodiment, the panel contains illustrations on both exterior faces of the panel.

Dimensions of the panels of the construction toys described herein should be appropriate for use by the age range of children or other individuals who will be using the toy. For example, panel dimensions should be suitable to allow a user (e.g., a child) to pick panels up and manipulate them with their hands.

Figure 8:
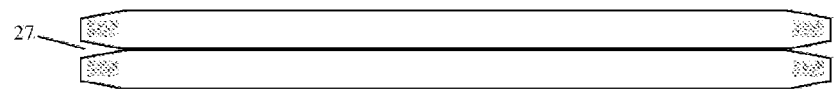
FIG. 8 depicts a sectional view through two panels that are sandwiched together with parallel faces and magnetically attracted edges, showing one embodiment of an edge design that facilitates pulling the panels apart.

Panels may be stored or carried in a sandwiched configuration, with faces parallel or substantially parallel to each other and bound together by magnetic attraction at magnetic edges. When sandwiched, the magnetic attraction between panels may make it challenging to pull the panels apart to initiate play, particularly for small children or individuals impaired in certain motor skills. In some embodiments, a spacer is provided in the form of a ridge or gap between panels, which facilitates pulling sandwiched panels apart. Spacers may be configured to provide finger hold leverage and/or to reduce panel-to-panel magnetic attraction when panels are sandwiched face-to-face, by increasing the distance between the edge magnets. In some embodiments, spacers are configured such that magnetic attraction between sandwiched panels is reduced to a degree sufficient to facilitate pulling the panels apart, while preserving sufficient magnetic attraction between panel edges for use as a construction toy as described herein, e.g., sufficient attraction between magnetic edges to hold a three dimensional structure and/or scenery backdrop together. In some embodiments, panels may contain a bevel on at least a portion of at least one edge, as shown schematically in FIG. 8. A gap 27 between the edges allows insertion of a finger between panel edges and/or decreases magnetic attraction between magnets in adjacent magnetic edges in the stack of panels, to facilitate pulling the panels apart. In other embodiments, panels may contain a recessed area on at least a portion of at least one edge and/or on at least a portion of at least one face. In other embodiments, panels may contain at least one ridge on at least a portion of at least one edge and/or at least a portion of at least one face. In any of these nonlimiting examples, a gap or space is created between adjacent panels in a stack, making it easier to pull the stacked panels apart.

In some embodiments, a handle may be provided for ease of carrying panels that are stacked together with their faces parallel or substantially parallel to each other and bound together by magnetic attraction at magnetic edges. For example, ends of one or more handle(s) may be fastened to the substructure(s) of one or more panel(s) (e.g., with a central portion of a handle protruding through openings in an edge of a panel). In another example, handle(s) may contain magnetic or magnetically receptive material at the ends, which may attach by magnetic attraction to one or more edge(s) or face(s) of one or more panel(s) (e.g., as an accessory). The handle protrudes from the stack of panels, thus facilitating carrying a stack of panels as a group from one location to another. A handle may be made of any suitable material that is capable of supporting the weight of a desired stack of panels. For example, materials that may be suitable for construction of a handle include, but are not limited to, ribbon, cloth, rope, fabric, leather, plastic, wood, or metal chain.

Magnets

Figure 3:
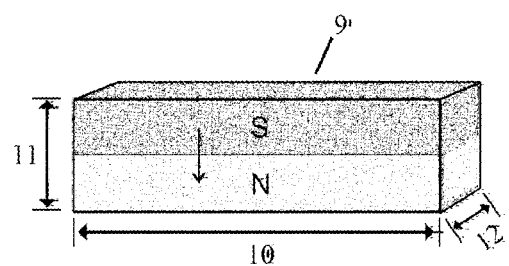
FIG. 3 depicts a dual pole block magnet having a length, width, and thickness, with magnetic polarity through the width of the magnet and perpendicular to its length.
Figure 4:
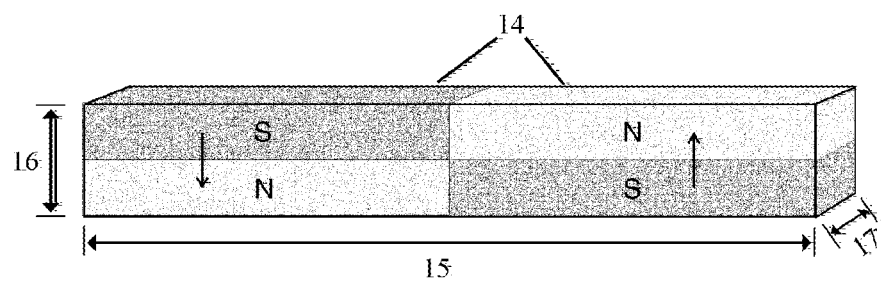
FIG. 4 depicts a multipole block magnet having a length, width, and thickness, with pairs of poles disposed along the length of the magnet and oriented with alternating magnetized directions through the width of the magnet and perpendicular to its length. Shown is a four pole magnet.

The construction toys described herein include panels that contain at least one magnetic edge. In some embodiments, more than one edge is magnetic. In further embodiments, all edges of a panel are magnetic. A magnetic edge includes at least one magnet embedded within proximity of the edge and oriented to magnetically attract a magnet embedded within proximity of the edge of another panel, such that the panel edges connect by magnetic attraction when they are brought into contact. In some embodiments, the magnets are configured such that the edges may undergo a magnetic attraction only when panels are contacted with a specific edge orientation, but preferably, the magnets are arranged such that panels may connect at any edge orientation. Exemplary, but not limiting, possibilities for magnet configurations that do not limit the orientation at which the panels may connect include use of two dual pole magnets or one or more multipole magnet per magnetic edge, as described in more detail below. "Dual pole" magnet refers to a magnet that contains one pair of magnetic poles. A nonlimiting example of a dual pole magnet is shown in FIG. 3. "Multipole" magnet refers to a magnet that contains more than one pair of magnetic poles. A nonlimiting example of a multipole magnet is shown in FIG. 4.

Typically magnets are embedded at a depth within the panels that is at close proximity to a panel edge, such that magnetic panel edges will magnetically attract each other when they are brought into close contact. A suitable depth for magnets within the panel edge may be dependent on factors such as the strength of the magnets and the type of material in which they are embedded. For example, the magnets should be embedded at a depth such that when two panels are connected by magnetic attraction at their respective magnetic edges and held or suspended with panel faces in a vertical orientation and with the connected magnetic edges at an intermediate position between the top panel and the bottom panel, the bottom panel will remain magnetically attached to the top panel. In one embodiment, magnets are embedded at a depth of ≤1 mm from the panel edge.

In some embodiments, a magnetic edge contains an even number of dual pole magnets (e.g., 2, 4, etc.) disposed in alternating magnetic orientation along the edge, and in alternating orientation around the panel if more than one edge is magnetic. A nonlimiting example of a dual pole magnet is shown in FIG. 3. The example shown in FIG. 3 is a block magnet 9 with two poles ("N") and ("S"), with the magnetized direction S to N shown with an arrow. The block magnet has a length 10, a width 11, and a thickness 12, and magnetized direction through the width. One embodiment of a panel edge is shown schematically in FIG. 5 with two dual pole block magnets 18, 19 embedded in an edge of a panel. Each block magnet is oriented with its length $L_m$ parallel or substantially parallel to the edge of the panel and its width perpendicular or substantially perpendicular to the face of the panel, embedded to a depth of at least its thickness in the edge of the panel, and oriented with a magnetized direction S to N (shown by arrows) through the width and perpendicular to the length of the magnet, with magnets configured in alternating S to N magnetic orientation along the panel edge. In an embodiment in which all edges of the panel contain dual pole magnets, the magnets are configured with an even number of magnets per edge and in alternating magnetic orientation around the edges of the panel.

Figure 5:
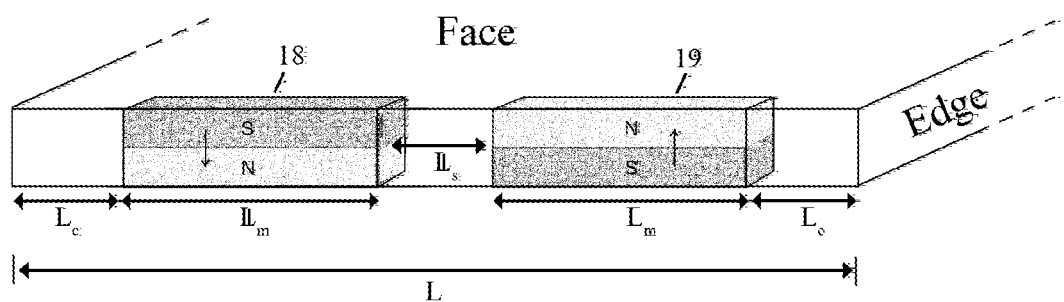
FIG. 5 depicts a perspective view, partly in section, of one embodiment of a panel, showing the positioning and orientation of dual pole magnets, oriented with alternating polarity in an edge of the panel.

In one embodiment, shown in FIG. 5, two dual pole block magnets 18 and 19 are configured in opposite, alternating magnetic orientation (indicated by arrows showing the magnetized directions through the magnets) on the edge of the panel. In some embodiments, the dual pole magnets are spaced symmetrically and/or a constant distance apart on each edge of a panel, or on each magnetic edge of the panels of the construction toy. For example, as shown in FIG. 5, where the total length of the panel edge is represented by L, the length of each magnet is $L_m$, the distance between magnets 18 and 19 is $L_s$, and the distance from each corner to the nearest magnet is $L_c$, $L=2L_c+2L_m+L_s$. A "corner" herein refers to the junction between two edges of a panel. In some embodiments, all magnetic edges within a group of panels contain dual pole magnets in alternating magnetic orientation and symmetrically configured on the edge, with $L_c$, $L_m$, and $L_s$ the same on each magnetic edge. In some embodiments, all edges of a panel are magnetic edges that contain dual pole magnets in alternating magnetic orientation and symmetrically configured on all edges, and in alternating magnetic orientation around the panel, with all $L_c$, all $L_m$, and all $L_s$ lengths the same around the panel. In some embodiments, all magnetic edges within a group of panels contain dual pole magnets in alternating magnetic orientation with $L_s$ the same on each magnetic edge, and $L_m$ and $L_c$ lengths the same or different. In some embodiments, all edges of a panel are magnetic edges that contain dual pole magnets in alternating magnetic orientation, and in alternating magnetic orientation around the panel, with $L_s$ the same on each magnetic edge, and $L_m$ and $L_c$ lengths the same or different. In some embodiments, all magnetic edges within a group of panels contain dual pole magnets in alternating magnetic orientation with $L_m$ and $L_s$ the same on each magnetic edge, and $L_c$ lengths the same or different. In some embodiments, all edges of a panel are magnetic edges that contain dual pole magnets in alternating magnetic orientation, and in alternating magnetic orientation around the panel, with $L_m$ and $L_s$ the same on each magnetic edge, and $L_c$ lengths the same or different.

In some embodiments, a magnetic edge contains at least one multipole magnet that contains adjacent pairs of magnetic poles of opposite polarity, where the number of poles is equal to 4n and n is an integer ≥1, with the magnet configured along the edge of the panel such that magnetized directions through each pair of poles are oriented with alternating polarity. A nonlimiting embodiment of a multipole magnet is shown in FIG. 4. The multipole block magnet depicted in FIG. 4 contains two pairs of poles (four poles, i.e., n=1) in alternating magnetic polarity. The multipole magnet has a length 15, a width 16, and a thickness 17, and alternating magnetized directions through the width. Two pairs of poles 14 are configured in alternating magnetic polarity S to N, indicated by arrows.

Where more than one multipole magnet is embedded in an edge of a panel or where more than one edge of a panel contains the multipole magnets with pairs of magnetic poles of opposite polarity, where the number of poles is equal to 4n and n is an integer ≥1, the magnets are disposed along the edge or around the panel in the same orientation of polarity. This is shown schematically in FIG. 7.

Figure 6:
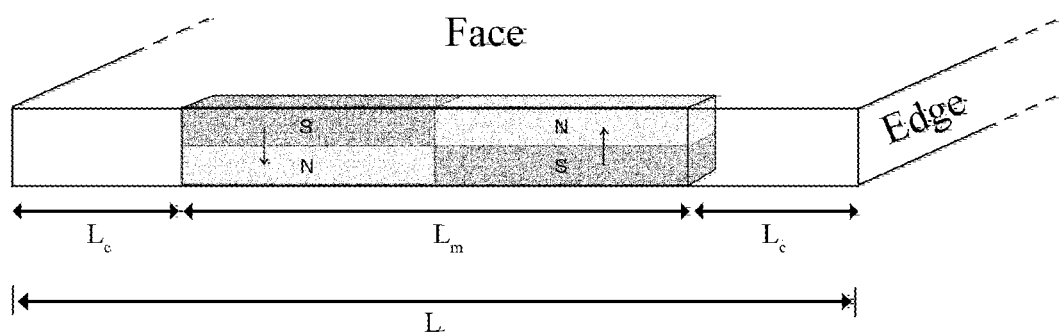
FIG. 6 depicts a perspective view, partly in section, of one embodiment of a panel, showing the positioning and orientation of a four-pole multipole magnet in an edge of the panel.
Figure 7:
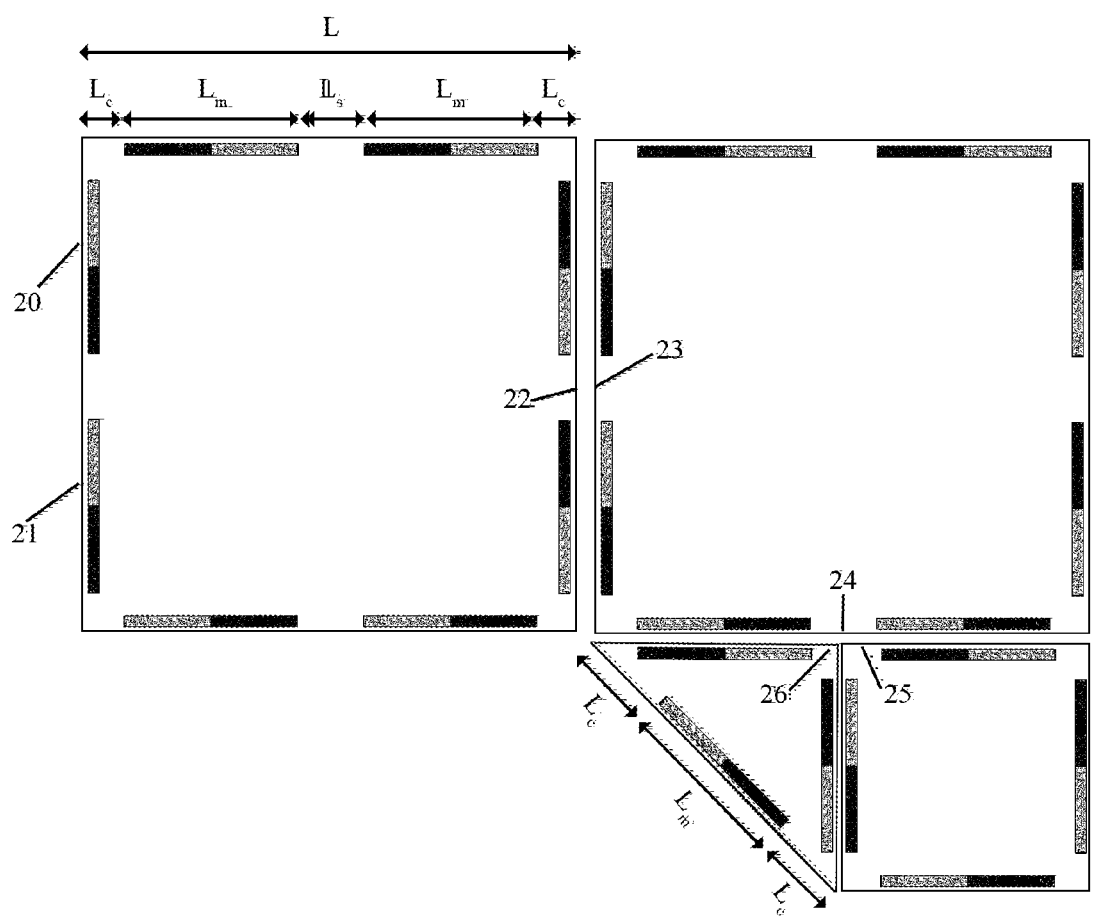
FIG. 7 depicts a plan view of several panels connected magnetically at edges that contain one or two multipole magnets, oriented with the same polarity around the edges of the panels.

In one embodiment, shown in FIG. 6, one multipole block magnet with 4n magnetic poles in pairs of poles of opposite polarity, where n is an integer ≥1, is configured on the edge of a panel. In other embodiments, more than one of the multipole magnets may be configured on the edge of a panel, with the multipole magnets configured in the same magnetic orientation. In embodiments in which the multipole magnets are on each edge of a panel, they are configured in the same magnetic orientation around the panel. For example, FIG. 7 shows magnetic edges with two of the multipole magnets (e.g., 20 and 21) configured on a panel edge in the same magnetic orientation, and in the same orientation around the panel. In the embodiments depicted in FIGS. 6 and 7, a multipole magnet is configured with its length parallel or substantially parallel to the edge of the panel, with its width perpendicular or substantially perpendicular to the face of the panel and embedded to a depth of at least its thickness in the edge of the panel. The magnet contains pairs of poles disposed along the length of the magnet with alternating magnetized directions through the width of the magnet and perpendicular to its length.

In some embodiments, the multipole magnet(s) with 4n magnetic poles in pairs of poles of opposite magnetic polarity, where n is an integer ≥1, are spaced symmetrically and/or a constant distance apart on each edge of a panel, or on each magnetic edge of the panels of the construction toy. For example, where the total length of the panel edge is represented by L, the length of each magnet is $L_m$, the distance between magnets on a panel edge is $L_s$, and the distance from each corner to the nearest magnet is $L_c$, $L=2L_c+nL_m+(n-1)L_s$, where n is the number of magnets on the panel edge. In some embodiments, all magnetic edges within a group of panels contain the multipole magnets symmetrically configured on the edge, with $L_c$, $L_m$, and $L_s$ the same on each magnetic edge. In some embodiments, all edges of a panel are magnetic edges that contain the multipole magnets symmetrically configured on all edges with all $L_c$, all $L_m$, and all $L_s$ lengths the same around the panel, and with the magnets in the same magnetic orientation around the panel. In some embodiments, all magnetic edges within a group of panels contain the multipole magnets with $L_s$ the same on each magnetic edge, and $L_m$ and $L_c$ lengths the same or different. In some embodiments, all edges of a panel are magnetic edges that contain the multipole magnets with $L_s$ the same on each magnetic edge, and $L_m$ and $L_c$ lengths the same or different, and with the magnets configured in the same magnetic orientation around the panel. In some embodiments, all magnetic edges within a group of panels contains the multipole magnets with $L_m$ the same. In some embodiments, all magnetic edges within a group of panels contain the multipole magnets with $L_m$ the same and $L_s$ and $L_c$ lengths the same or different. In some embodiments, all edges of a panel are magnetic edges that contain the multipole magnets with $L_m$ the same and $L_s$ and $L_c$ lengths the same or different, and with the magnets configured in the same magnetic orientation around the panel.

In some embodiments, a magnetic edge contains an even number of multipole magnets (e.g., multipole block magnets) that each contains an odd number of pairs of poles of opposite polarity. Each magnet is oriented along the edge of the panel with alternating magnetized directions through the pairs of poles and perpendicular to the panel edge, and the magnets are configured with alternating orientation of polarity with respect to one another along the panel edge. The multipole magnets may be configured with their lengths parallel or substantially parallel to the edge of the panel, with their widths perpendicular or substantially perpendicular to the face of the panel, and embedded to depths of at least their thicknesses in the edge of the panel. Each magnet contains an odd number of pairs of poles disposed along the length of the magnet with alternating magnetized directions through the width of the magnet and perpendicular to its length. In some embodiments, an even number of the multipole magnets is spaced symmetrically and/or a constant distance apart on each edge of a panel, or on each magnetic edge of the panels of the construction toy, with the multipole magnets disposed around a panel in alternating orientation of polarity.

Frame Construction

In some embodiments, panels of the construction toys described herein may be assembled within a frame that surrounds the edges of the panel. The frame may be made of any suitable material and of any suitable construction that seals the edges of the panel and substantially prevents movement of the magnets when a magnetic edge of a panel is in contact with a magnetic edge of another panel. As a safety feature, the frame may be constructed and affixed to the panel such that it cannot be easily removed, which prevents removal of the magnets by a user.

Figure 10:
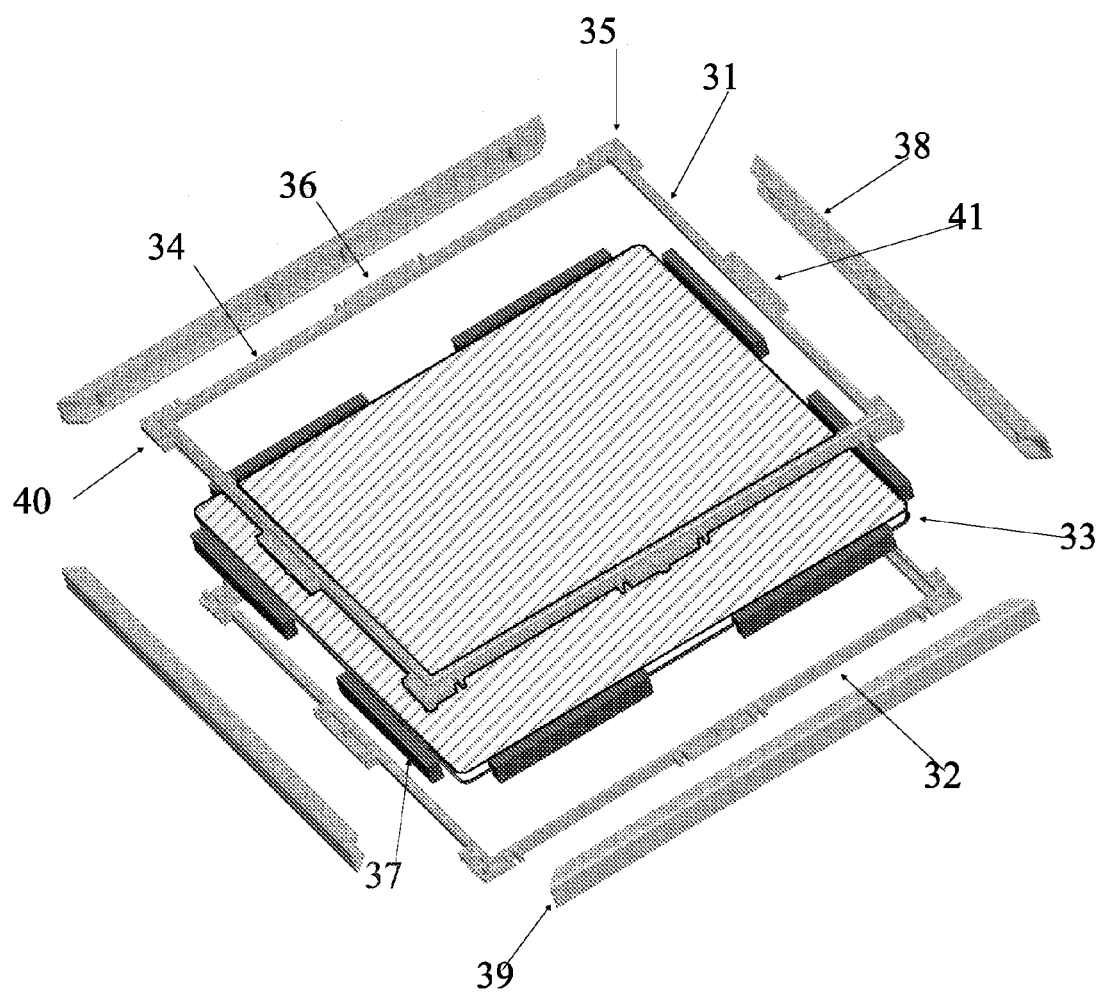
FIG. 10 depicts an embodiment of a panel frame construction.
Figure 11:
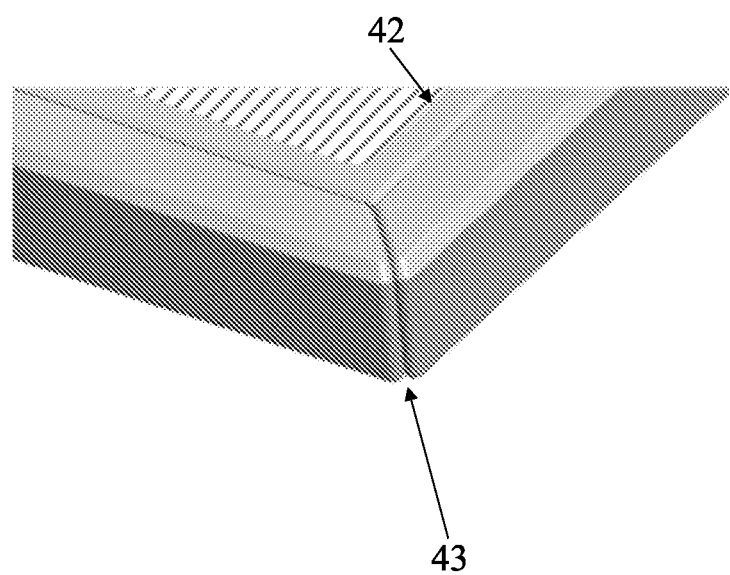
FIG. 11 depicts an assembled panel and frame.

In one exemplary but non-limiting embodiment, a frame is constructed as illustrated in FIG. 10. First and second frame pieces 31 and 32 are configured and of dimensions such that when they are joined together they will form a frame that surrounds the edges of the panel 33 and provides slots 34 for insertion of magnets 37. In some embodiments, the frame also overlaps a small portion of the face of the panel along each edge, as shown in FIG. 11 (42). First and second frame pieces 31 and 32 are configured such that they may be fastened or snapped together, e.g., via pins, slots, grooves, or the like, at corners 35 and between magnets 36, holding the panel substructure and additional layers, if any, in place between the frame pieces and creating slots for placement of the magnets at the panel edges. The magnets 37 may then be inserted into the slots created by the joined first and second frame pieces. Exterior edge pieces 38 are then placed on each edge to hold the magnets in place, surrounding the first and second frame pieces on all edges of the panel. Edge pieces 38 are configured and of dimensions to encase the magnets, optionally fastening to structures (40, 41) on the first and second frame pieces. In some embodiments, the ends of the edge pieces 39 are slanted such that a mitered corner will be formed between adjacent edge pieces (FIG. 11, 43). The frame and edge pieces may be made of any suitable material that will provide support for the panels, holding the substructure of the panels, additional layers, if any, and magnets in place. For example, frame and edge pieces may be constructed of plastic or wood. In one embodiment, the frame and edge pieces of constructed of injection molded plastic. In one embodiment, the frame and edge pieces of constructed of plastic and the frame is sonic welded to provide a tight seal after the edge pieces are placed around the edges of the frame In other embodiments, the frame and edge pieces are glued or mechanically fastened in place.

Figure 12:
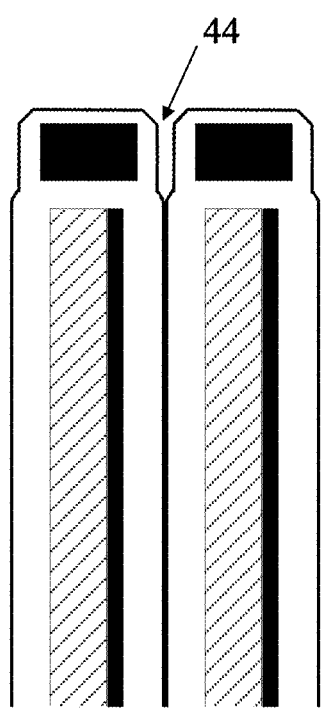
FIG. 12 depicts panels in a face to face configuration.
Figure 13:
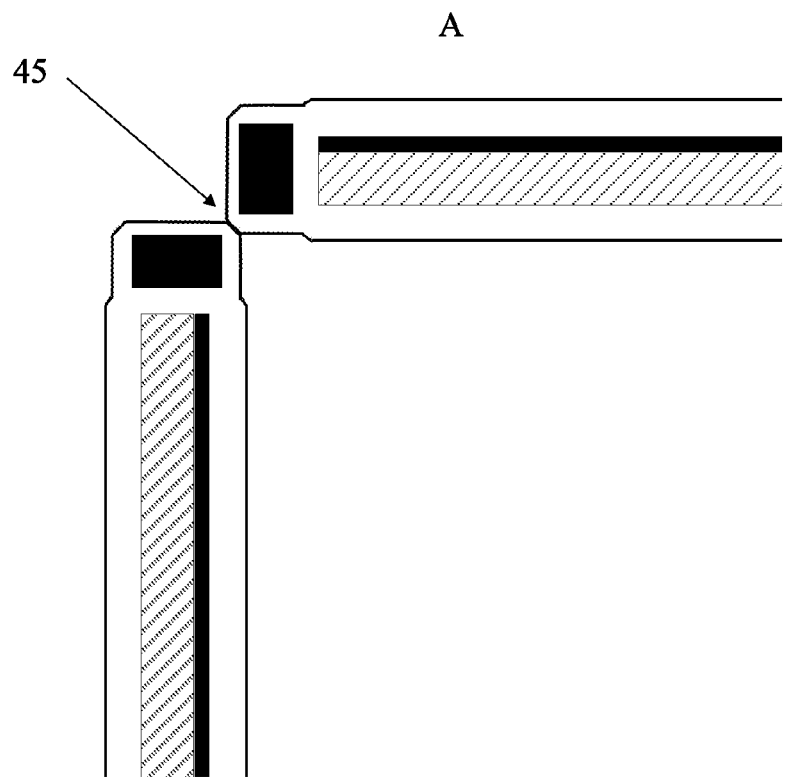
FIG. 13 depicts cross-sections of panels assembled in various geometries.
Figure 13:
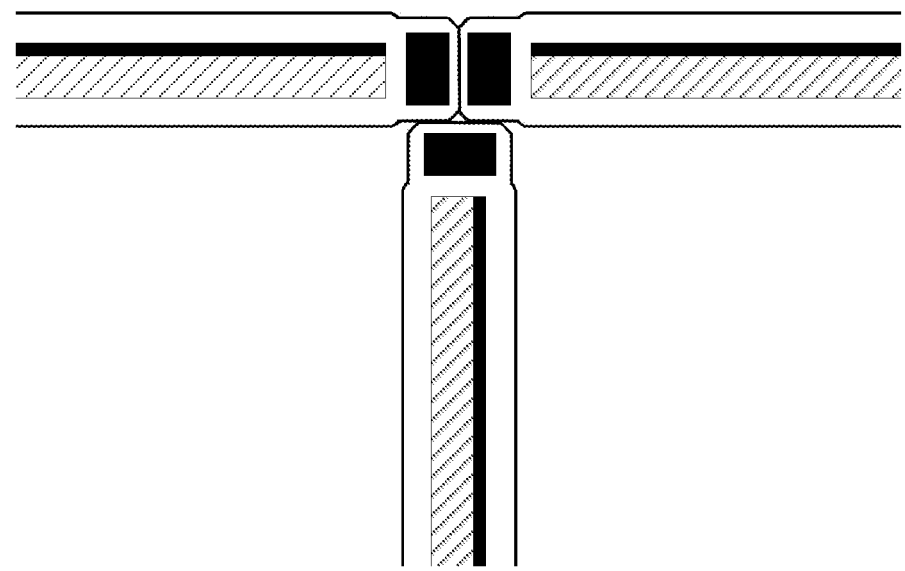

In some embodiments, the first and second frame pieces may have a raised surface where they overlap the panel face, such that a gap is present at the corners between panels when the panels are stacked face to face (FIG. 12, 44), which facilitates ease of pulling stacked panels apart by a user, both by reducing the magnetic attraction between panels and by providing a finger hold. In some embodiments, edge pieces may be cut with an angled section at their ends such that panels connect at their corners without a gap when joined in a perpendicular configuration (FIG. 13A, 45). An embodiment of panels with such corners, joined together in a T-shaped configuration for constructions of a three-dimensional structure is shown schematically in FIG. 13B. FIGS. 13A and 13B show cross-sections of panels to demonstrate the geometry that results when separate panels interact in various positions as structures are constructed. In some embodiments, the frame design disclosed herein assists in minimizing the distance between magnets during construction by a user and provides additional physical support for the panels, both reducing the distance and providing a physical resting point, with panels arranged at 90 degree angles meeting at an angle (FIG. 13A, 45).

Accessory Items

Accessory items may optionally be used in conjunction with the construction toy described herein to embellish the illustrated scenes on the panels or to further enhance creative play or storytelling. In some embodiments, ways in which accessory items may attach or adhere to illustrated panel face(s) include, but are not limited to, magnetic attraction, adhesively, by static electricity, or mechanically (e.g., a hook, a rod that fits into an opening, etc.).

Figure 2:
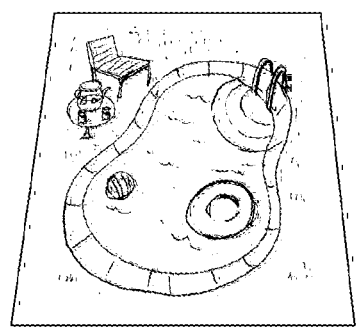
FIG. 2 depicts optional accessory items as described herein.
Figure 2:
Figure 2:
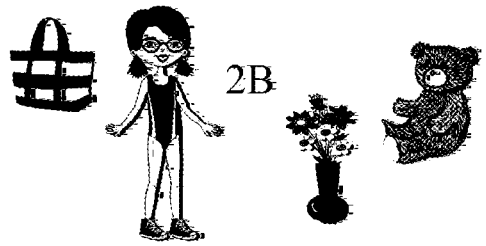

As shown in FIG. 2C, an accessory item 7 may be configured to attach or adhere to the illustrated face of panel 1 such that it lays flat on the illustration depicted thereon. Alternatively, an accessory item 8 may be configured to project outward from the face of the panel at an angle, with at least one surface or portion of the accessory item attached or adhered to the panel face. In FIG. 2C, accessory item 8 as shown is a human figure with foot portions attached or adhered to the face of panel 1 and the remainder of the figure projecting up from the panel face.

In some embodiments, an accessory item includes at least one magnetic or magnetic receptive surface that may be magnetically attracted to a magnetic receptive or magnetic material, respectively, that is located on or inside of the face of an illustrated panel. An accessory item may contain one or more magnetic or magnetic receptive surface(s). An accessory item may optionally be configured so that the item may be magnetically attached to panel faces in a number of different orientations.

A magnetic or magnetic receptive surface of an accessory item may be configured such that the item lays flat on the illustration on the face of the panel (e.g., parallel to the face) and is held in place by magnetic attraction. This is shown schematically in FIG. 2C (7). Alternatively, a magnetic or magnetic receptive surface of an accessory item may be configured such that the item projects outward from the face of the panel at an angle (e.g., perpendicular to the face or at some other angle), also shown schematically in FIG. 2C (8).

Accessory items may be designed to be moved from one location to another within the constructed structure or scene, or may be designed as stationary embellishments that magnetically attach at a specific location on a panel. Nonlimiting examples of accessory items include human and animal figures, furniture, clothing, food, tools, appliances, bags or other containers, scenery embellishments (e.g., trees, flowers), vehicles, light fixtures, and weapons.

In some embodiments, an accessory item may include moving parts and optionally, a motor, and may be powered, for example, via a battery or electricity. Nonlimiting examples of such accessory items include a fan that spins, a light fixture that lights up, a crane that pivots, or a motile human or animal figure.

Methods of Use

Illustrated panels and optional accessory items as described herein may be connected together magnetically in a method to create structures and scenes for imaginative play. In some embodiments, the method includes combining panels by magnetic attraction between adjacent edges to assemble a three-dimensional structure, such as a house, building, or other enclosure. The method includes bringing magnetic edges of illustrated panels, as described herein, within proximity such that they magnetically attract each other to construct structures or scenes. The structure may include two or more walls, and optionally, roof/ceiling, floor, and/or exterior attached scenery and/or auxiliary structure(s). In some embodiments, the method includes combining panels by magnetic attraction between adjacent edges to form a contiguous scene, such as a rural, urban, or suburban setting. Panels may be connected at their magnetic edges such that faces form a 90° angle, a 180° angle, an acute angle, or an obtuse angle.

The faces of at least some of the panels are illustrated, as described herein, to facilitate creation of narrative, stories, or other imaginative endeavor in connection with the structures and/or scenery constructed. In some embodiments, panels are illustrated such that they may be combined and rearranged in several different ways by changing the order and/or orientation of panels, connected magnetically at their edges, to create different structures, scenes, and/or creative story lines.

Optional accessory items, as described herein, may be added to further embellish the structure or scene that has been constructed. At least one surface of an accessory item may attach or adhere (e.g., magnetically, adhesively, via static electricity or mechanically) to a face of a panel, and optionally the panels may be configured such that the accessory item may be moved around to different locations within the same or different panels as desired by the user.

Although the foregoing invention has been described in some detail by way of illustration and examples for purposes of clarity of understanding, it will be apparent to those skilled in the art that certain changes and modifications may be practiced without departing from the spirit and scope of the invention, which is delineated in the appended claims. Therefore, the description should not be construed as limiting the scope of the invention.

All publications, patents, and patent applications cited herein are hereby incorporated by reference in their entireties for all purposes and to the same extent as if each individual publication, patent, or patent application were specifically and individually indicated to be so incorporated by reference.

I claim:

1. A construction toy, comprising:
a plurality of panels, wherein each panel comprises an interior subpanel structure and an exterior frame that surrounds the interior subpanel structure,
wherein each panel comprises two faces and at least three edges, and comprises corners between adjacent edges, wherein the subpanel structure of each panel comprises the two faces, and wherein the subpanel structure and the surrounding exterior frame comprise the same number of edges and corners as the panel, wherein at least one panel comprises an illustration on at least one face of the interior subpanel structure, wherein each panel comprises at least three magnetic edges, wherein each magnetic edge comprises at least one magnet embedded within said panel exterior frame in proximity to said edge, and wherein the magnets are configured such that panels may be connected by magnetic attraction at their magnetic edges to form illustrated three-dimensional structures and/or scenes, wherein the exterior frame comprises: (i) first and second frame pieces that are configured and of dimensions such that when they are joined together they form a frame that surrounds the edges of the subpanel structure, wherein the first frame piece overlaps a portion of one face of the subpanel structure and the second frame piece overlaps a portion of the other face of the subpanel structure, wherein the first and second frame pieces are fastened together, thereby forming a seam between the first and second frame pieces and providing slots for insertion of magnets; and (ii) a plurality of frame edge pieces, wherein each frame edge piece surrounds the first and second frame pieces along the length of a single edge of the fastened first and second frame pieces and covers the seam formed between the first and second frame pieces, encasing at least one magnet positioned in a slot formed by the fastened first and second frame pieces, wherein the frame edge pieces are tightly sealed to the first and second frame pieces, thereby sealing the edges of the panel, wherein the number of frame edge pieces is equal to the number of edges of the panel, and wherein adjacent frame edge pieces meet at an angle, forming a miter joint at each corner of the panel.

2. A construction toy according to claim 1, wherein each edge of each panel is a magnetic edge.

3. A construction toy according to claim 1, wherein said magnetic edge comprises at least one multipole magnet, wherein each multipole magnet comprises adjacent pairs of magnetic poles of opposite polarity and in alternating magnetic orientation, and wherein the number of poles is equal to 4n where n is an integer greater than or equal to 1.

4. A construction toy according to claim 1, wherein said magnetic edge comprises two dual pole magnets, wherein the two magnets on said edge are oriented with opposite polarity with respect to one another.

5. A construction toy according to claim 1, wherein panels may be connected at their magnetic edges such that illustrations on adjacent faces form a contiguous illustrated scene, and wherein panels may be rearranged in sequence and/or converted to different orientations to create a multitude of different scenes and/or structures.

6. A construction toy according to claim 1, further comprising at least one accessory item that is capable of attaching or adhering to at least one panel face.

7. A construction toy according to claim 6, wherein said attachment or adherence to the panel face comprises magnetic attraction, adhesion, or static electricity, or mechanical attachment.

8. A construction toy according to claim 6, wherein the accessory item comprises a human or animal figure, furniture, clothing, food, a tool, an appliance, a bag, a container, a scenery embellishment, a vehicle, a light fixture, or a weapon.

9. A construction toy according to claim 6, wherein at least one panel comprises a material that will magnetically attract a magnetic or magnetically receptive portion of an accessory item to a face of the panel.

10. A construction toy according to claim 9, wherein at least a portion of at least one face of the subpanel structure comprises a magnetic receptive material, wherein a magnetic portion of an accessory item will bind to an exterior surface of the panel by attraction to the magnetic receptive material.

11. A construction toy according to claim 1, wherein the first and second frame pieces comprise a raised surface, creating a ridge above the faces of the interior subpanel structure, thereby providing a spacer between magnets in adjacent panels when they are stacked with faces parallel to each other and bound together by magnetic attraction at their magnetic edges, wherein said spacer facilitates pulling the stacked panels apart.

12. A construction toy according to claim 1, wherein each of said panels comprises themed illustrations on at least one face, wherein the magnets in magnetic edges of the panels are configured such that panels may be connected by magnetic attraction at their magnetic edges such that the illustrations on adjacent panel faces visually combine to form a contiguous assembled three-dimensional illustrated themed backdrop scene that depicts an interior and/or exterior environment and comprises at least one of an interior wall, ceiling, and/or floor element, an exterior building surface, and/or a rural, urban, or natural exterior landscape; and further comprising at least one human or animal figure or other accessory item that is themed to interact with the assembled backdrop provided by the illustrated panels and that comprises a magnetic portion, wherein at least a portion of at least one face of a subpanel structure of at least one panel comprises a magnetic receptive material, wherein the magnetic portion of the accessory item will bind to the exterior surface of the panel by attraction to the magnetic receptive material.

13. A method for manufacturing the plurality of panels of the construction toy according to claim 1, comprising assembling a frame around an interior subpanel structure on each of said panels, wherein each panel comprises an interior subpanel structure and an exterior frame that surrounds the interior subpanel structure, wherein each panel comprises two faces and at least three edges, and comprises corners between adjacent edges, wherein the subpanel structure of each panel comprises the two faces, and wherein the subpanel structure and the surrounding exterior frame comprise the same number of edges and corners as the panel, wherein each panel comprises an illustration on at least one face of the interior subpanel structure, wherein each panel comprises at least three magnetic edges, wherein each magnetic edge comprises at least one magnet embedded within said panel in proximity to said edge, and wherein each panel is manufactured by:
(a) joining first and second frame pieces around the edges of the subpanel structure, such that the subpanel is captured between the first and second frame pieces, wherein the first and second frame pieces are configured and of dimensions such that when they are joined together they form a frame that surrounds the edges of the subpanel structure, wherein the first frame piece overlaps a portion of one of the faces of the subpanel structure and the second frame piece overlaps a portion of the other face of the subpanel structure, wherein the first and second frame pieces are fastened together, thereby forming a seam between the first and second frame pieces, and providing slots for insertion of magnets;
(b) inserting at least one magnet into at least one slot provided by the joined first and second frame pieces;
(c) covering each edge of the joined first and second frame pieces with a frame edge piece, wherein each frame edge piece surrounds the first and second frame pieces along the length of a single edge of the fastened first and second frame pieces and covers the seam formed between the first and second frame pieces, thereby holding the first and second frame pieces together and holding the at least one magnet in place in the frame, wherein the number of frame edge pieces is equal to the number of edges of the panel, and wherein adjacent frame edge pieces meet at an angle, forming a miter joint at each corner of the panel; and
(d) tightly sealing the frame edge pieces to the first and second frame pieces, thereby sealing the edges of the panel and encasing the magnet and subpanel structure within the frame.

14. A method according to claim 13, wherein the first and second frame pieces are constructed of injection molded plastic and wherein step (d) comprises sonic welding.

15. A method according to claim 13, wherein step (b) comprises inserting multipole block magnets into slots provided by the joined first and second frame pieces on each edge of the panel,
wherein each multipole magnet comprises adjacent pairs of magnetic poles of opposite polarity and in alternating magnetic orientation,
wherein the number of poles is equal to 4n where n is an integer greater than or equal to 1, and
wherein the magnets are disposed around the panel in the same orientation of polarity with respect to each other.

16. A method according to claim 13, wherein step (b) comprises inserting two dual pole magnets into slots provided by the joined first and second frame pieces on each edge of the panel,
wherein the two magnets on each edge are oriented with opposite polarity with respect to one another.

17. A method according to claim 13, wherein the subpanel structure is formed by adhering multiple layers together, comprising:
(i) a structural layer comprising plastic, wood, foam, or cardboard, or a combination thereof;
(ii) a layer comprising a magnetic receptive material covering at least a portion of at least one face of the structural layer; and
(c) an exterior layer with printed graphics covering the layer comprising magnetic receptive material and forming an illustrated face of the panel.

18. A method according to claim 13, comprising fastening the first and second frame pieces together via pins at corners and between inserted magnets, prior to step (c).

* * * * *